United States Patent
Wu et al.

(10) Patent No.: US 6,897,431 B2
(45) Date of Patent: May 24, 2005

(54) METHOD FOR MEASURING OPTOELECTRONIC CHARACTERISTICS OF ORGANIC LIGHT EMITTING DIODE

(75) Inventors: Ming-Hsin Wu, Taoyuan Hsien (TW); Ju-Chung Chen, Taipei Hsien (TW); Shu-Shin Lin, Yunlin Hsien (TW); Yen-Lin Wang, Miaoli Hsien (TW)

(73) Assignee: RiTdisplay Corporation, Hsinchu (TW)

( * ) Notice: Subject to any disclaimer, the term of this patent is extended or adjusted under 35 U.S.C. 154(b) by 289 days.

(21) Appl. No.: 10/248,712

(22) Filed: Feb. 12, 2003

(65) Prior Publication Data

US 2004/0155174 A1 Aug. 12, 2004

(51) Int. Cl.$^7$ ................................................ H01L 31/00
(52) U.S. Cl. ..................................... 250/214.1; 250/205
(58) Field of Search ............................... 250/214.1, 205, 250/214 P; 257/80, 81, 82, 84; 362/16, 257, 800

(56) References Cited

U.S. PATENT DOCUMENTS 6,333,522 B1 * 12/2001 Inoue et al. .................. 257/99

* cited by examiner

*Primary Examiner*—Que T. Le
(74) *Attorney, Agent, or Firm*—Jiang Chyun IP Office

(57) ABSTRACT

A method for measuring optoelectronic characterstics of an organic light emitting diode. A computer, a power supply and a cavity are provided. The cavity has a tooling, on which at least one photodiode is mounted. A high temperature, high humidity, or high temperature and humidity condition is applied to the cavity. The computer is used to control the power supply for supplying a current or a voltage to the organic light emitting diode to generate a light with a brightness. A signal carrying brightness information of the light is then transmitted to the computer (two signals with different brightness have to be input to the computer first) for performing data process.

14 Claims, 1 Drawing Sheet

METHOD FOR MEASURING OPTOELECTRONIC CHARACTERISTICS OF ORGANIC LIGHT EMITTING DIODE

BACKGROUND OF INVENTION

1. Field of the Invention

The invention relates in general to an optoelectronic measurement method, and more particularly, to a method for measuring optoelectronic characteristics of an organic light emitting diode.

2. Related Art of the Invention

Organic light emitting diode is a kind of flat panel display that converts electricity into optic energy with high conversion efficient. The commonly seen application of organic light emitting diode includes cellular phone, personal digital assistant (PDA), and light sources for various flat panel display. Having the characteristics such as viewing angle independence, simple fabrication process, low cost, high response speed, broad range of application temperature, and full color, the organic light emitting diode meets the requirement of displays in the multi-media era and becomes a popular research topic in industry.

Normally, after an organic light emitting diode is fabricated, temperature, humidity and optoelectronic tests are performed thereon. That is, the organic light emitting diode is disposed in a high temperature, high humidity or high temperature and humidity environment to test the optoelectronic characteristics thereof. The testing method is described as follows.

An organic light emitting diode is disposed in a constant temperature and a constant humidity test machine (such as the machine GTM-225-40-1P). A high temperature, high humidity or high temperature and humidity condition is applied to the constant temperature and humidity test machine. For every period of time (for example, every four hours, eight hours or twenty-four hours), the constant temperature and humidity machine is switched off. The organic light emitting diode is then manually removed from the constant temperature and humidity test machine after the temperature therein is reduced. A power supply for supplying lit-up current of the organic light emitting diode is applied, and optoelectronic measurement equipment (such as SR-2, BM-7 or BM-5) is used to measure the brightness variation of the organic light emitting diode. According to the data of brightness variation manually measured by the optoelectronic measurement equipment, the data are then input to a computer for further process.

With the conventional measurement method, the constant temperature and humidity test machine, the power supply and the optoelectronic measurement equipment are three unrelated apparatuses. Therefore, the organic light emitting diode has to be manually removed from the constant temperature and humidity test machine, and the optoelectronic characteristics thereof are then measured using the optoelectronic measurement equipment. As a result, the high temperature and humidity test is affected to consequently affect the measurement accuracy. Further, as the organic light emitting diode is not removed until the temperature of the constant temperature and humidity test machine is reduced, waiting time for increasing and reducing temperature is consumed. In addition, the conventional measurement equipment requires manually removing the organic light emitting diode from the constant temperature and humidity test machine, manual recording the measurement data, and manually inputting the data into the computer. The conventional measurement equipment is thus very laborious. Further, manually place and remove the organic light emitting diode in and out of the constant temperature and humidity test machine easily injure the operator when improper operation should occur.

SUMMARY OF INVENTION

The present invention provides a method for measuring optoelectronic characteristics of an organic light emitting diode that uses automatic measurement to replace the conventional manual measurement process, such that the labor cost is saved.

The present invention provides a method for measuring optoelectronic characteristics of an organic light emitting diode which improves the inaccurate measurement using the conventional measurement method.

The present invention provides a method for measuring optoelectronic characteristics of an organic light emitting diode to save the waiting time for temperature increase and decrease required for using the conventional measurement method.

The method for measuring optoelectronic characteristics of an organic light emitting diode includes the following steps. A computer, a power supply and a cavity are provided. The cavity comprises a tooling on which at least one photodiode is mounted. An organic light emitting diode is disposed on the tooling disposed in the cavity. A high temperature, high humidity or high temperature and humidity condition is applied to the cavity. The computer is used to control the power supply supplying a constant current, voltage or other condition to light up the organic light emitting diode. Meanwhile, a brightness of the light generated by the organic light emitting diode is measured by the photodiode within the tooling. The photodiode generates a signal reflecting the brightness measured thereby and delivers the signal to the computer to perform data process. In the present invention, the computer is configured to control the power supply providing a constant current, voltage or other condition to light up the organic light emitting diode once every while, while the brightness of the light generated by the organic light emitting diode is monitored by the photodiode.

The method for measuring optoelectronic characteristics of an organic light emitting diode provides automatic measurement, such that the labor cost is reduced.

Using the method provided by the present invention, the organic light emitting diode is not moved in and out of the test machine during measurement, such that the waiting time for temperature rise and drop is saved.

Without moving the organic light emitting diode in and out of the test machine during measurement, the measurement accuracy is enhanced.

BRIEF DESCRIPTION OF DRAWINGS

These, as well as other features of the present invention, will become more apparent upon reference to the drawings wherein.

DETAILED DESCRIPTION

Figure 1:
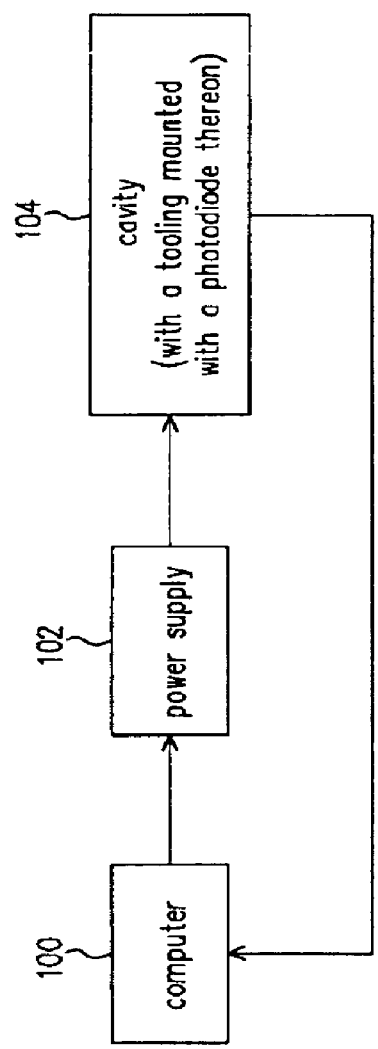
FIG. 1 is process flow of a method for measuring optoelectronic characteristics of an organic light emitting diode according to the present invention.

FIG. 1 is a process flow showing a method for measuring optoelectronic characteristics of an organic light emitting diode according to the present invention.

Referring to FIG. 1, in the method for measuring optoelectronic characteristics of an organic light emitting diode, a computer 100, a power supply 102 and a cavity 104 are provided. The cavity 104 includes a tooling disposed therein, while a photodiode is mounted on the tooling.

A high temperature, a high humidity or a high temperature and humidity condition is applied to the cavity 104. For example, the high temperature condition includes a temperature between 25° C. and 100° C., the high humidity condition includes a relative humidity of about 40 to about 100.

The computer 100 then controls the power supply 102 for supplying a constant current, voltage or other condition to the cavity 104, so as to light up the organic light emitting diode. Meanwhile, the photodiode on the tooling measures the brightness of the light generated by the organic light emitting diode. The brightness measured by the photodiode is then carried by a signal input to the computer 100 for further data process. The data process includes a data processing step, a graph generating step or a statistics analyzing step.

In the present invention, the sampling time of the photodiode 106 on the tooling is configured by the computer 100. That is, the timing for lighting up the organic light emitting diode, and the timing for delivering the measuring the signal to the computer 100 are determined by the computer 100.

The computer 100 is further configured to allow the power supply providing a constant current, voltage or other condition to the cavity 104 for every period of time for lighting up the organic light emitting diode, so as to measure the brightness of the light generated thereby. According to the measured brightness carried by the signal, the computer 100 performs further data process.

In the present invention, the photodiode is disposed in the tooling of the cavity to monitor brightness variation of the organic light emitting diode in real time. Compared to the conventional test machine requires moving in and out of the organic light emitting diode, the labor and waiting time are significantly reduced. For example, the conventional measurement requires 2 labors per day, while the measurement provided by the present invention requires only 0.5 labors per day. Therefore, four times of labor is reduced. Further, as the removal of the organic light emitting diode is not required, the measurement accuracy of optoelectronic characteristics is not affected by interruption of high temperature and high humidity. Moreover, the present invention uses the computer to set up the measurement frequency, that is, the optoelectronic characteristics of the organic light emitting diode are measured with a specific frequency, such that the minor variation can be monitored. In addition, the automatic measurement precludes the operators from being injured by a direct contact with the high temperature and humidity.

Therefore, the present invention comprises at least the following advantages.

1. The present invention provides an automatic measurement of optoelectronic characteristics of an organic light emitting diodes, such that the labor is greatly reduced.

2. The present invention saves the waiting time for the decrease and increase of temperature, since removal of the organic light emitting diode is not required.

3. The measurement accuracy is enhanced since the high temperature and high humidity condition applied to the organic light emitting diode is not interrupted by the removal of the light emitting diode.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. A method for measuring optoelectronic characteristics of an organic light emitting diode, comprising:
   providing a computer, a power supply and a cavity that comprising a tooling disposed therein, wherein the tooling further comprises a photodiode mounted thereon;
   disposing an organic light emitting diode in the tooling disposed in the cavity; using the computer to control the power supply for lighting up the organic light emitting diode; and
   using the photodiode to measure a brightness of a light generated by the organic light emitting diode and transmitting a signal carrying information of brightness of the light to the computer for performing a data process.

2. The method according to claim 1, further comprising a step of using the computer to control a frequency of the power supply for lighting up the organic light emitting diode.

3. The method according to claim 1, further comprising a step of using the computer to set up a sampling time of the photodiode.

4. The method according to claim 1, wherein the data process further comprises a data processing step, a graph establishing step and a statistics analyzing step.

5. The method according to claim 1, further comprising a step of controlling an internal temperature of the cavity between about 25° C. and about 100° C.

6. The method according to claim 1, further comprising a step of controlling an internal relative humidity of the cavity between about 40 and about 100.

7. The method according to claim 1, further comprising a step of controlling the power supply to provide a current to the organic light emitting diode, so as to light up the organic light emitting diode.

8. The method according to claim 1, further comprising a step of controlling the power supply to provide a voltage to the organic light emitting diode, so as to light up the organic light emitting diode.

9. A method for measuring optoelectronic characteristics of an organic light emitting diode, comprising:
   providing a computer, a power supply and a tooling on which at least one photodiode is mounted;
   disposing the organic light emitting diode on the tooling; and
   measuring brightness of a light generated by the organic light emitting diode by the photodiode and transmitting a signal of the brightness to the computer for performing a data process.

10. The method according to claim 9, further comprising a step of using the computer to control a frequency of the power supply for lighting up the organic light emitting diode.

11. The method according to claim 9, further comprising using the computer to set up a sampling time of the photodiode.

12. The method according to claim 9, wherein the data process further comprises a data processing step, a graph making step and a statistics analyzing step.

13. The method according to claim 9, further comprising a step of supplying a current to light up the organic light emitting diode by the power supply.

14. The method according to claim 9, further comprising a step of supplying a voltage to light up the organic light emitting diode by the power supply.

* * * * *